United States Patent
Saito

(10) Patent No.: US 7,466,713 B2
(45) Date of Patent: Dec. 16, 2008

(54) SERVICE PROCESSOR GATEWAY SYSTEM AND APPLIANCE

(75) Inventor: Marcio Saito, San Jose, CA (US)

(73) Assignee: Avocent Fremont Corp., Fremont, CA (US)

( * ) Notice: Subject to any disclaimer, the term of this patent is extended or adjusted under 35 U.S.C. 154(b) by 610 days.

(21) Appl. No.: 10/976,728

(22) Filed: Oct. 29, 2004

(65) Prior Publication Data

US 2005/0129035 A1    Jun. 16, 2005

(51) Int. Cl.
*H04L 12/28* (2006.01)
(52) U.S. Cl. .................. 370/401; 370/356; 709/223; 709/224
(58) Field of Classification Search ............. 370/401, 370/356; 709/224, 223
See application file for complete search history.

(56) References Cited

U.S. PATENT DOCUMENTS 6,526,442 B1 *   2/2003   Stupek et al. ............... 709/224
2002/0116485 A1 * 8/2002  Black et al. ................. 709/223
2002/0128043 A1   9/2002  Chandler
2003/0041030 A1 * 2/2003  Mansfield .................... 705/50
2005/0094629 A1 * 5/2005  Zhao et al. .................. 370/356

OTHER PUBLICATIONS

International Preliminary Report on Patentability and Written Opinion, mailed May 10, 2007, from International Application No. PCT/US2005/039411.
International Search Report mailed Oct. 13, 2006, from International Application No. PCT/US2005/039411.

* cited by examiner

*Primary Examiner*—David Q Nguyen
(74) *Attorney, Agent, or Firm*—Davidson Berquist Jackson & Gowdey, LLP

(57) ABSTRACT

A system for physically consolidating and securing access to service processors and management modules in computer, telecommunication and networking equipment is provided that isolates the management ports from the data network. The system converts low-level management protocols into higher-level network protocols suitable for secure transport over the data network. The system may encrypt the common format management data. The system may also authenticate each user that attempts to access the management interfaces.

13 Claims, 7 Drawing Sheets

SERVICE PROCESSOR GATEWAY SYSTEM AND APPLIANCE

FIELD OF THE INVENTION

This invention relates to the field of computer network management and specifically to methods for accessing and managing computer, networking, and telecommunication systems equipped with embedded service processors and/or management modules.

BACKGROUND OF THE INVENTION

Information Technology professionals commonly use network management tools for monitoring and restoring the operation of network nodes such as computer servers, network appliances, security appliances, storage devices, and telecommunication equipment. These typical network management tools permit the IT professional to manage and restore the operations of the network nodes remotely. Typically, these network management tools are divided in two categories: in-band management tools and out-of-band management tools. An in-band management tool communicates with the managed network node using the same network interface utilized by the node for connection to the data network. An out-of-band management tool communicates with the managed network node using a separate access media (such as a serial console port) that is used exclusively for management. The out-of-band management tool permits the supervisor to access the managed network nodes even when the network nodes lose network connectivity.

The in-band management tools use network protocols, such as Simple Network Management Protocol (SNMP), which are commonly used to manage large networks. Several examples of commercial in-band management tools using the network protocols are the HP® Open View, IBM® Tivoli, BMC® Patrol, and CA® Unicenter products. However, these in-band tools become ineffective whenever the data network associated with the network nodes fails or a managed device loses network connectivity. Thus, these in-band network management tools leave network administrators in a deadlock position (e.g., the device fails and brings the data network down and the IT professional cannot reach the device because the data network is down). Examples of common causes of the deadlock position include software crashes, configuration errors, hardware malfunctions caused by power surges, need to upgrade firmware and/or network failures. Thus, failures that cause the network node to be disconnected from the data network require a human operator to travel to the location of the network node so that the human operator can interact with the piece of failing equipment through a terminal directly connected to a management port or actuate physical control switches to restore functionality of the failing equipment. The need to have a human operator travel to the location of the network node is expensive, causes a great amount of time to be spent by the human operator, and incurs business losses by causing long data network downtime.

To overcome this limitation of in-band network management tools, systems were created that enable the remote access to the out-of-band management ports and other control functions of the network node, such as power-cycling, monitoring of temperature and other health indicators, without the need for a human operator to physically travel to the location where the incident occurred. Typically, the physical interfaces for out-of-band access include serial consoles, KVM ports, power circuits, temperature and humidity probes and/or remote actuators. Examples of monitoring and access systems that provide remote access to those physical interfaces include Console Servers, KVM Switches, and Intelligent Power Distribution Units. While effective, building an alternative, independent network using different connection media for out-of-band access increases the cost of building a data center.

In an effort to standardize the physical interfaces and reduce the cost of out-of-band access, server and telecommunication hardware manufacturers started to install service processors into hardware platforms such as stand-alone server motherboards, telecommunications chassis, and blade computers. Service processors, sometimes also called Baseboard Management Cards (BMCs) can take the form of a small processor embedded into the system motherboard of a stand-alone server, an add-on daughter card, or a more sophisticated management module installed in a large system such as a blade computer or telecommunication system chassis. The service processor is designed to remain active and accessible even when modules of the host equipment lock up or otherwise become disconnected from the data network due to a configuration error, hardware or software failure. Service processors may support functionality such as remote power cycling, remote diagnostics, sensor reading, system reset, system console and KVM access.

An industry consortium has developed a standard interface called Intelligent Platform Management Interface (IPMI) for communication with service processors. Other vendors have created similar proprietary interfaces. For example, HP® has its Integrated Lights-Out (iLO) interface and Sun Microsystems® has its Advanced Lights Out Module (ALOM) interface. More sophisticated service processors may support a variety of other interfaces and network protocols. The protocols for these interfaces are well known. These out-of-band management interfaces define a protocol above TCP/IP and utilize common Ethernet media for transport of the management information. Ethernet media was selected by the designers of those systems for its compatibility with structured cabling systems already deployed in large data centers and to facilitate the deployment and use of server processor technology.

Service Processors can in some cases share the same Ethernet port used for connection of the network node with the data network (this is sometimes called "side-band" connection). Sharing of the same network connection to the data network is not a good solution because it defeats the original purpose of offering remote access when data network connectivity is lost. Therefore most service processors are deployed with an Ethernet port that is dedicated for out-of-band management and is independent of the primary data network connection.

However, adoption of service processor technology has been slowed down by the high cost of deployment and the management overhead introduced by a second Ethernet connection per managed network node, an obstacle that had not been foreseen when that media was selected. For example, every device connected to the Ethernet switching system in a data network requires a unique network address (IP address in a TCP/IP network). Typically, the number of network addresses available for use by one organization is limited and doubling the need for network addresses poses a serious problem. Those network addresses must be managed and properly secured by setting and maintaining access policies in a firewall, tasks that increase network complexity and demand substantial amount of work and recurrent cost. The Ethernet LAN connections available in a typical data center are dimensioned for carrying data traffic and use switching equipment with far more capacity and bandwidth than required by the management application so that contributes to further increase the cost of deployment. By exposing the low-level management protocols used by service processors to the Ethernet switching systems, this architecture can also increase the vulnerability of out-of-band management systems to attacks by individuals trying to gain undue control over the systems.

So, cost of deployment and security concerns become prohibitive and a significant obstacle to the adoption of service processor technology. The evidence is that, even with a compelling set of features, support by major vendors in the industry, and several years of widespread availability, service processor architectures such as IPMI, iLO and ALOM have not yet been adopted as widely as expected when those architectures were proposed. Demand for external access and monitoring systems (console servers, KVM switches, intelligent power distribution units, etc) meant to be displaced by service processor technologies have continued to rise. Thus, there is a need for a service processor gateway system in accordance with the invention that overcomes these limitation of conventional systems and it is to this end that the present invention is directed.

SUMMARY OF THE INVENTION

The Service processor gateway comprises a method for physically consolidating and logically securing the Ethernet connections needed for access to service processors and management modules embedded in computer, networking and telecommunication equipment, lowering the cost and reducing complexity of deployment and operation of service processor technologies. The invention is a system that combines hardware and software designed specifically for this function. The invention provides the required Ethernet connectivity to a plurality of service processors and, at the same time, eliminates the need for allocating, managing and securing a dedicated network address for each service processor.

The system accomplishes the above advantages by providing point-to-point (rather than switched) Ethernet connections and terminating the session with the service processor locally using one of the possible management protocols supported by the service processor, such as IPMI, iLO and ALOM command line interfaces or web-based protocols. The Service processor gateway retrieves and processes the management information from a plurality of sources and then expose the consolidated information to a local or remote management gateway, agent or human operator through a single network connection using a higher-end, secure protocol suitable for transport over the wide area network which may include but is not limited to the following protocols: Secure Shell (SSH), Secure Socket Layer (SSL), Extended Markup Language (XML), Secure HyperText Transfer Protocol (HTTPS), or Data Center Markup Language (DCML).

The cost and complexity of managing multiple switched Ethernet connections of the typical system are eliminated and the service processor protocols are kept within the equipment rack and not exposed to the data network. Therefore, the system also greatly increases the security of the network.

Thus, in accordance with the invention, an out-of-band management system for computer networks is provided. The system comprises a plurality of network nodes equipped with embedded service processors or management modules accessible via a dedicated Ethernet interface that is separated from the data transmission interfaces. The Service processor gateway is a management appliance that has computing hardware specifically designed and built for that purpose that provides Ethernet connectivity to the service processors embedded in each network node. The Service processor gateway further comprises a software application executing on the management appliance that terminates the session with the service processor, extracts the management information and exposes that information to a remote management agent using a protocol suitable for transport over the wide area network.

DETAILED DESCRIPTION OF A PREFERRED EMBODIMENT

The invention is particularly applicable to an out-of-band network management system that interfaces with specific managed devices, protocols and interfaces set forth below over the Internet and it is in this context that the invention will be described. It will be appreciated, however, that the system and method in accordance with the invention has greater utility since the system may be used with any existing interfaces and protocols as well as any newly developed interfaces and protocols.

Figure 1:
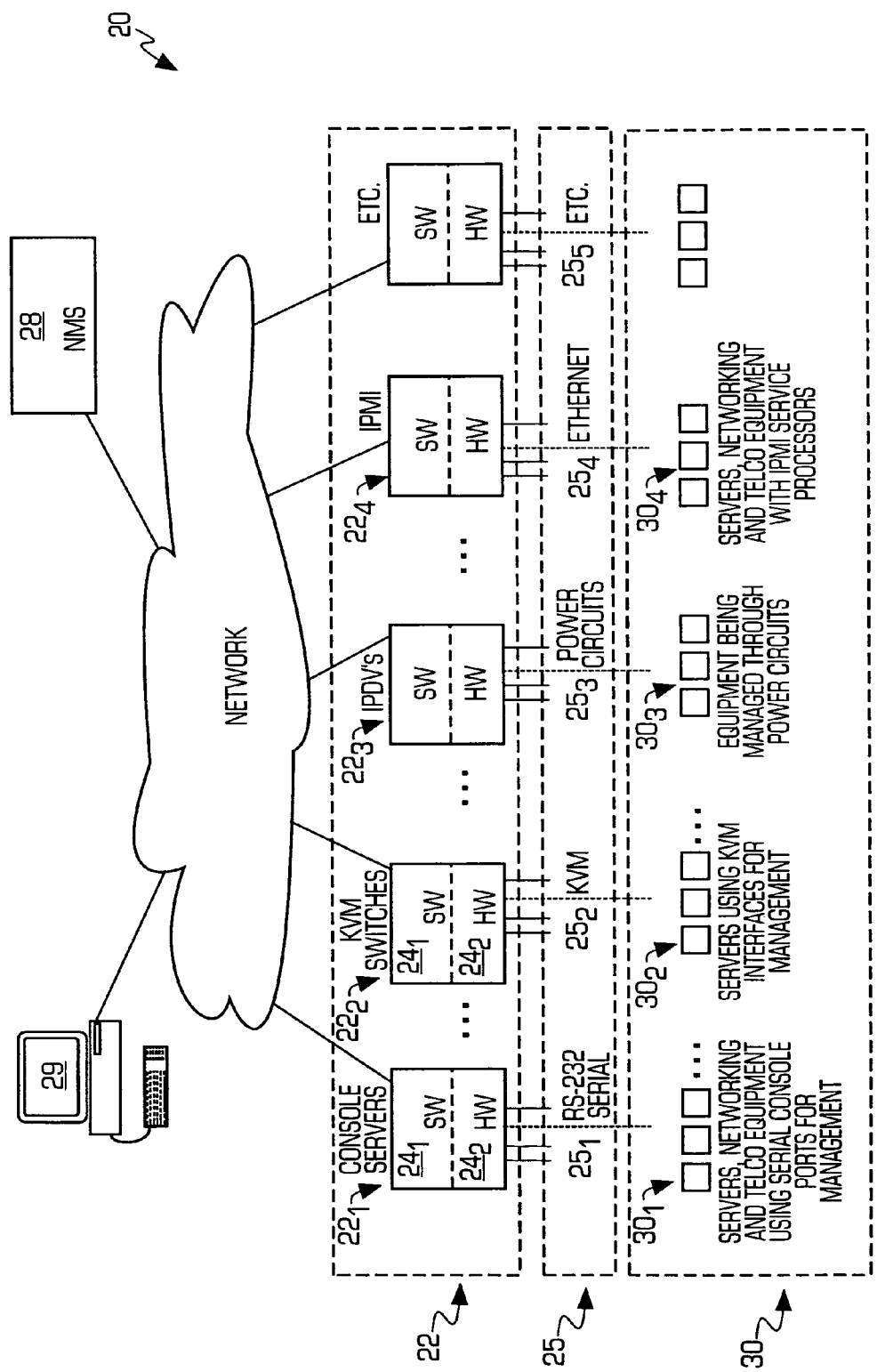
FIG. 1 is a diagram illustrating a typical out-of-band network management system.

FIG. 1 is a diagram illustrating a typical out-of-band network management system 20. The system 20 has one or more out-of-band monitoring/access devices 22, including but not limited to one or more console server devices $22_1$, one or more keyboard video mouse (KVM) switches $22_2$, one or more intelligent power distribution units (IPDUs) $22_3$, and one or more service processor monitors $22_4$ (using a protocol such as IPMI as shown.) Each of these devices 22 is typically composed by a hardware component $24_1$ and a software component $24_2$ that perform various functions/operations and implement the monitoring and access function for the particular device. In this typical system, each device 22 monitors a particular type of managed device using a particular physical media 25 for access, such as an RS-232 serial interface $25_1$ used to monitor and manage Linux and Unix servers and network equipment $30_1$ using the well known RS-232 protocol. As another example, the KVM interface $25_2$ is used to monitor Windows servers with a well known KVM protocol. In this system, each device 22 monitors and manages a particular managed device or group of managed devices 30, including but not limited to Unix Servers, Windows Servers, Blade Servers and Blade chassis, Telecommunication equipment, network routers, switches, load balancers, network attached storage and remote access servers, and generates management data about that group of managed devices. As shown, each device may utilize a different protocol, such as the RS-232 protocol, the KVM protocol, the power device protocol, the IPMI protocol etc. The management data generated by each device 22 has its own unique protocol and format. Thus, each device 22 consolidates the out of band management data, but focuses on a single type of media, such as a serial console server by MRV, Cyclades, or Lantronix, a KVM console by Avocent, Cyclades, or Raritan, an IPMI console by Intel, Blade Computer monitoring software by IBM or HP, etc. . . . In the case of network nodes that are managed using service processors $22_4$ (such as IPMI, HP iLO, Sun's ALOM, blade computers management models, etc), which are the subject of this invention, the monitoring device 22 typically uses Ethernet media $25_4$ as the physical media for connection.

Figure 2:
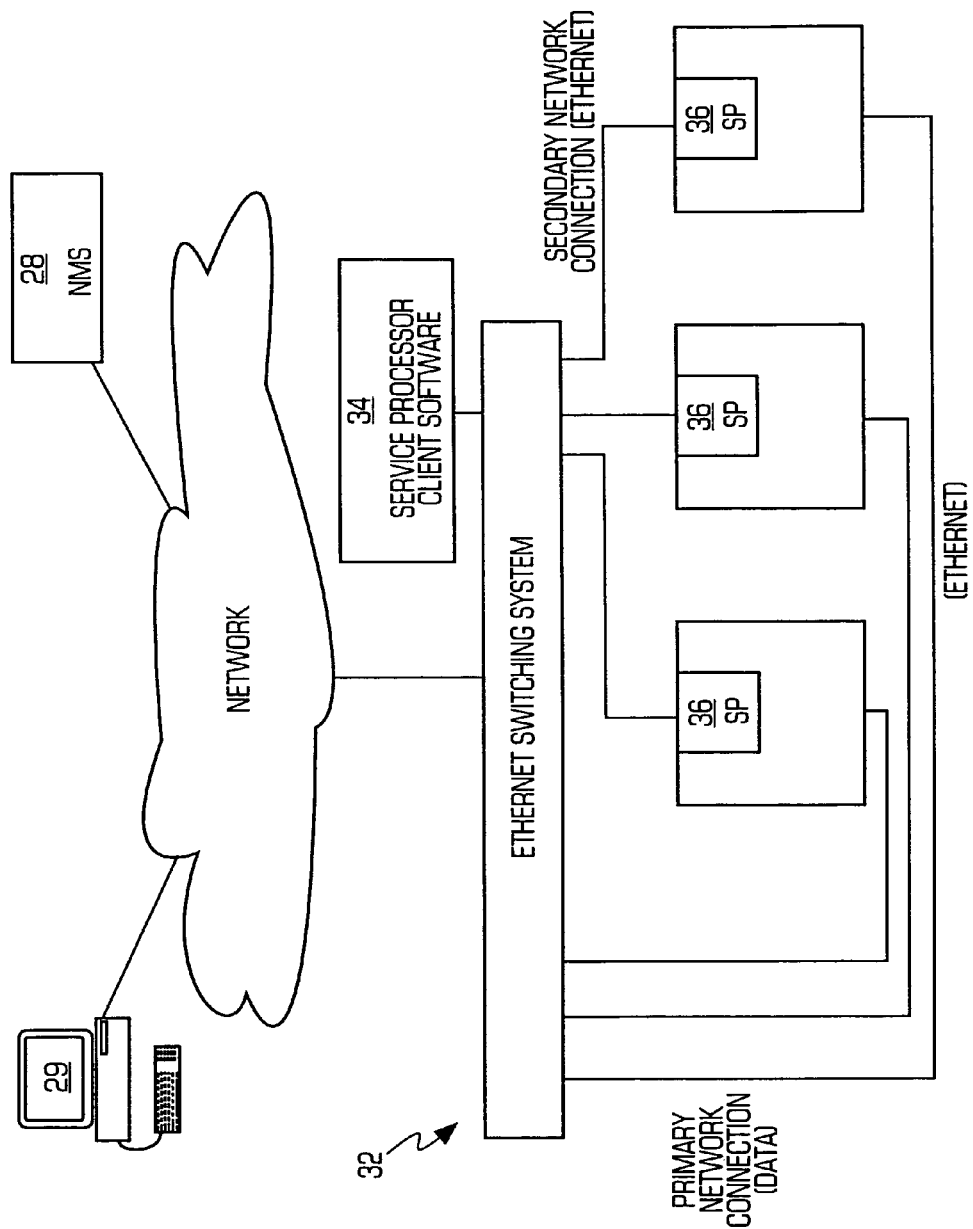
FIG. 2 is a diagram illustrating the access method for service processors in a typical out-of-band network management system.

FIG. 2 illustrates more details of the monitoring/access systems for network nodes equipped with service processors in a typical system. The hardware piece is typically a general-purpose Ethernet switch 32 that may or may not be shared with the data network. This switching system connects to one or more service processors 36 embedded into the network nodes using standard Ethernet media. As shown, each service processor has its own Ethernet connection to the switch 32 that results in the limitations of this typical system as described above. The software piece of each service processor client typically executes on a general purpose server 34 that is also connected to the Ethernet switching system 32. The selection of the Ethernet access media and general purpose servers as components for service processor consolidation was chosen by the designers of the architecture so that users could take advantage of general purpose hardware readily available in the market. However, as previously explained, this selection also poses unforeseen cost and technical obstacles that keep service processor technologies from being widely adopted in the market. Thus, this typical method for accessing/monitoring network nodes equipped with service processors has some serious limitations and drawbacks that are overcome with the service processor gateway in accordance with the invention that will now be described in more detail.

Figure 3:
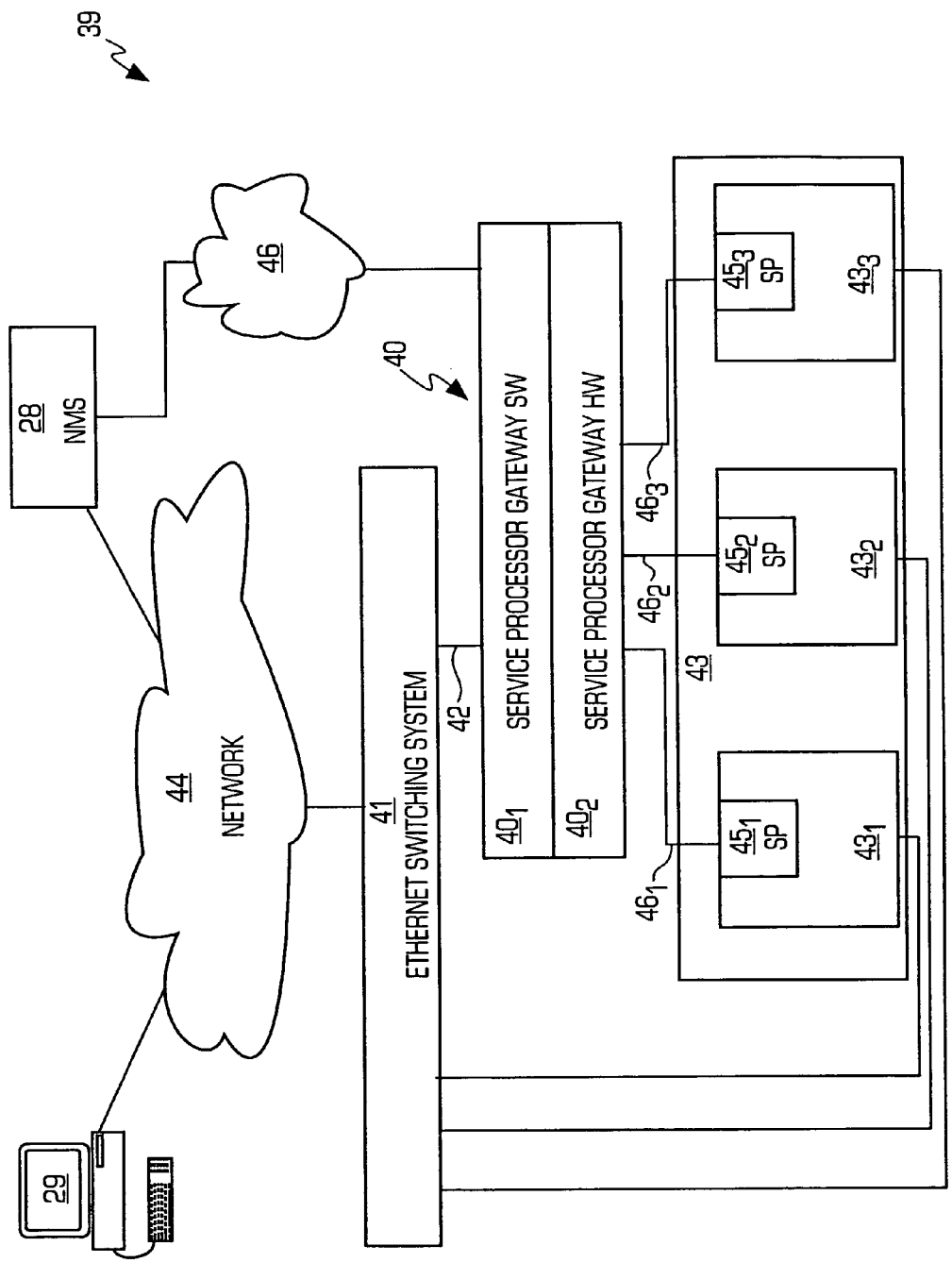
FIG. 3 is a diagram illustrating an out-of-band network management system that incorporates a service processor gateway in accordance with the invention that provides access to one or more service processors.

FIG. 3 illustrates an out-of-band network management system 39 that incorporates a service processor gateway 40 in accordance with the invention that provides access to one or more service processors $45_1$, $45_2$ and $45_3$ in this example although the invention is not limited to any particular number of service processor or any particular type of service processors. The service processor gateway 40 combines the connectivity previously provided by the Ethernet switching system with the software capabilities of the service processor client software, as well as additional software functionality as described below. By using point-to-point Ethernet connections $46_{1-n}$ (Ethernet connections $46_1$, $46_2$, $46_3$ are shown in the example but the invention is not limited to any particular number of point-to-point Ethernet connections) and locally terminating the session with the service processor $45_{1-n}$ embedded in each network node.

The service processor gateway 40 eliminates the need to allocate a network address (an IP addresses in the case of a TCP/IP network) for each service processor. The service processor gateway 40 thus can consolidate the management information for all of the service processors before connecting back to the in-band data network through a single network connection 42 to a network 44, such as the Internet, and then onto the typical management workstation 29 and the typical network management system 28. In particular, the service processor gateway 40 has a management interface and media (separate from the media and interface used to communicate the management data) over which the service processor gateway 40 may communicate with the network. In a preferred embodiment, the management interface and media for the service processor gateway 40 may be an Ethernet-type interface, including but not limited to Ethernet, Fast Ethernet, Gigabit Ethernet, 10 GB Ethernet media or any other type of Ethernet that may be developed in the future. The service processor gateway 40 may also have an optional out-of-band connection 46 that connects the service processor gateway 40 directly to the network management system 28 as shown.

In accordance with the invention, the service processor gateway 40 further comprises a software portion $40_1$ having a set of gateway software modules with each module comprising a plurality of lines of computer code that implement the functions of the gateway software described below. The service processor gateway 40 further comprises a hardware portion $40_2$ that has known computing resources to execute the software modules. The hardware and software portions of the service processor gateway may together be known as a service processor gateway appliance. The service processor gateway 40 consolidates the management data from one or more managed network nodes $43_1$-$43_N$ connected to the service processor gateway with the various different service processor protocols and converts the management data from all of the service processors into a common format as described below in more detail so that the management data of the managed network nodes can be transported over the network 44 to a local or remote management workstation or network management system 28 over the single network session 46. The gateway software $40_1$ may also include a module that encrypt the management data using well known techniques and then communicate the data over the communications network 44 using well known protocols. The gateway software $40_1$ may also include a module that authenticates a user of the service processor gateway management interfaces using a well known enterprise directory system. Thus, the service processor gateway 40 is able to enforce a security protocol for all of the management data. The service processor gateway also eliminates the transmission of the management data with the plurality of different protocols over the communications network 44 so that the total amount of data communicated over the communications network 44 is reduced. In a preferred embodiment, the encrypted or unencrypted management data from the service processor gateway 40 is communicated to the network management system 28 and/or workstation 29 using any well known protocols, such as a simple network management protocol (SNMP), a web-based protocol (HTTPS), SSH protocol, Secure Socket Layer (SSL) protocol, Extended Markup Language (XML) protocol, and/or Data Center Markup Language (DCML) protocol. In accordance with the invention, the protocol used to communicate the management data from the service processor gateway to the network management system 28 may be changed/updated to any protocol without departing from the scope of the invention. As shown, the typical primary connection network for the data from the managed network nodes $43_1$-$43_N$ to an Ethernet switching system 41 to the network 44.

Figure 4:
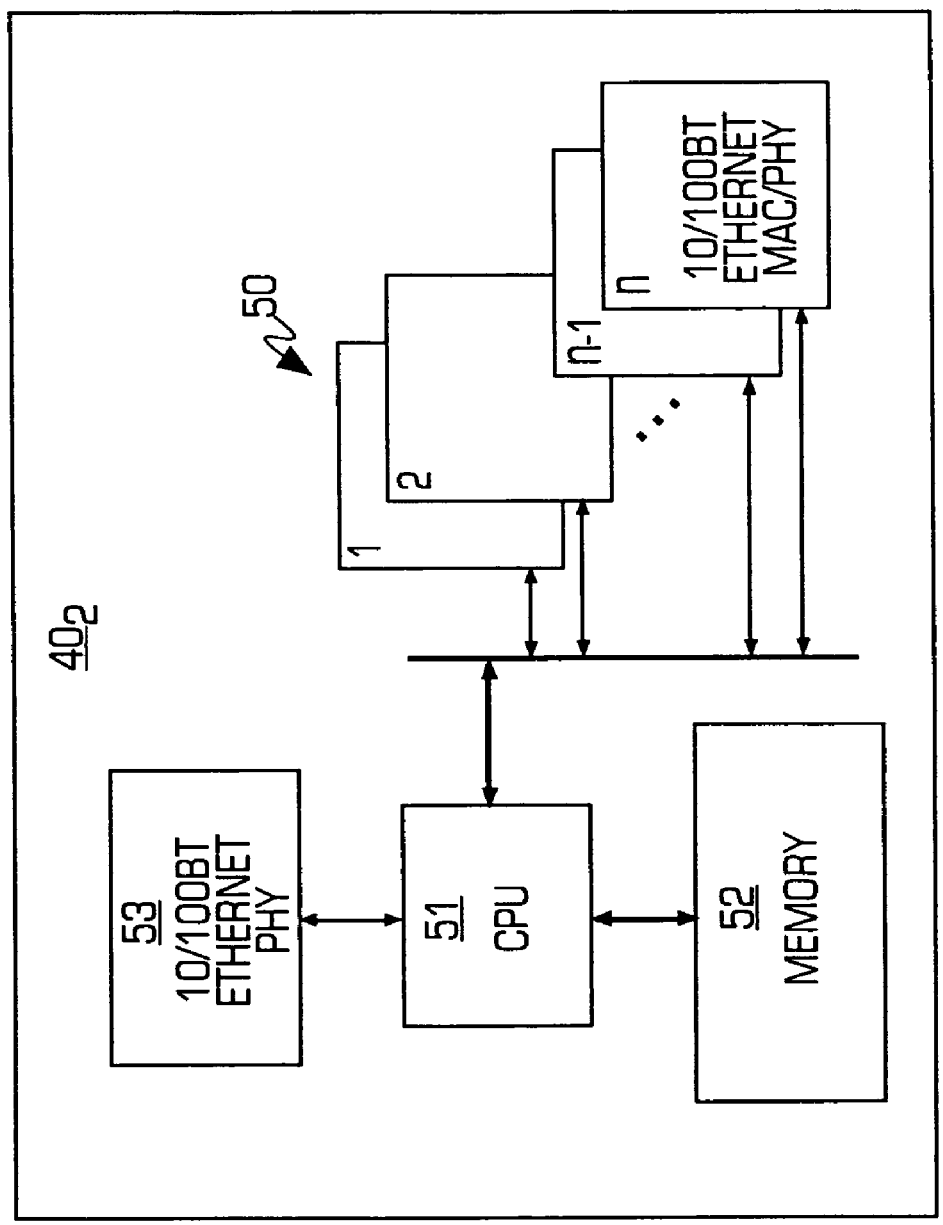
FIG. 4 is a block diagram illustrating an example of the hardware architecture of the service processor gateway in accordance with the invention.

FIG. 4 is a diagram illustrating the hardware $40_2$ architecture of the service processor gateway 40. The service processor gateway comprises a plurality of local Ethernet physical interfaces 50 (1 to n interfaces wherein each interface is connection to a particular service processor that is connected to the service processor gateway 40.) In a preferred embodiment, each interface may be a 10/100BT Ethernet MAC/PHY interface. The Ethernet interfaces provide point-to-point connections between the service processor gateway and each service processor and do not interconnected in a switching fabric as in a traditional Ethernet switch. The service processor gateway 40 further comprises a processor 51, such as a CPU, that terminates all of the Ethernet connections and hosts (and executes) the service processor gateway software in a typical system memory 52. The hardware may further comprise a separate Ethernet interface 53 that is used to connect the service processor gateway to the data network switching fabric as shown in FIG. 3. The local Ethernet interfaces 50 are not directly visible to the network as in a traditional switch or router so that the service processor gateway 40 physically isolates the service processor connections from the data network. In accordance to this invention, other hardware capabilities such as different network interfaces, disk storage capability, and hardware expansion through standard interfaces such as PCI, PCMCIA, IDE, PCI-X, and USB may be added without departing from the scope of the invention.

Figure 5:
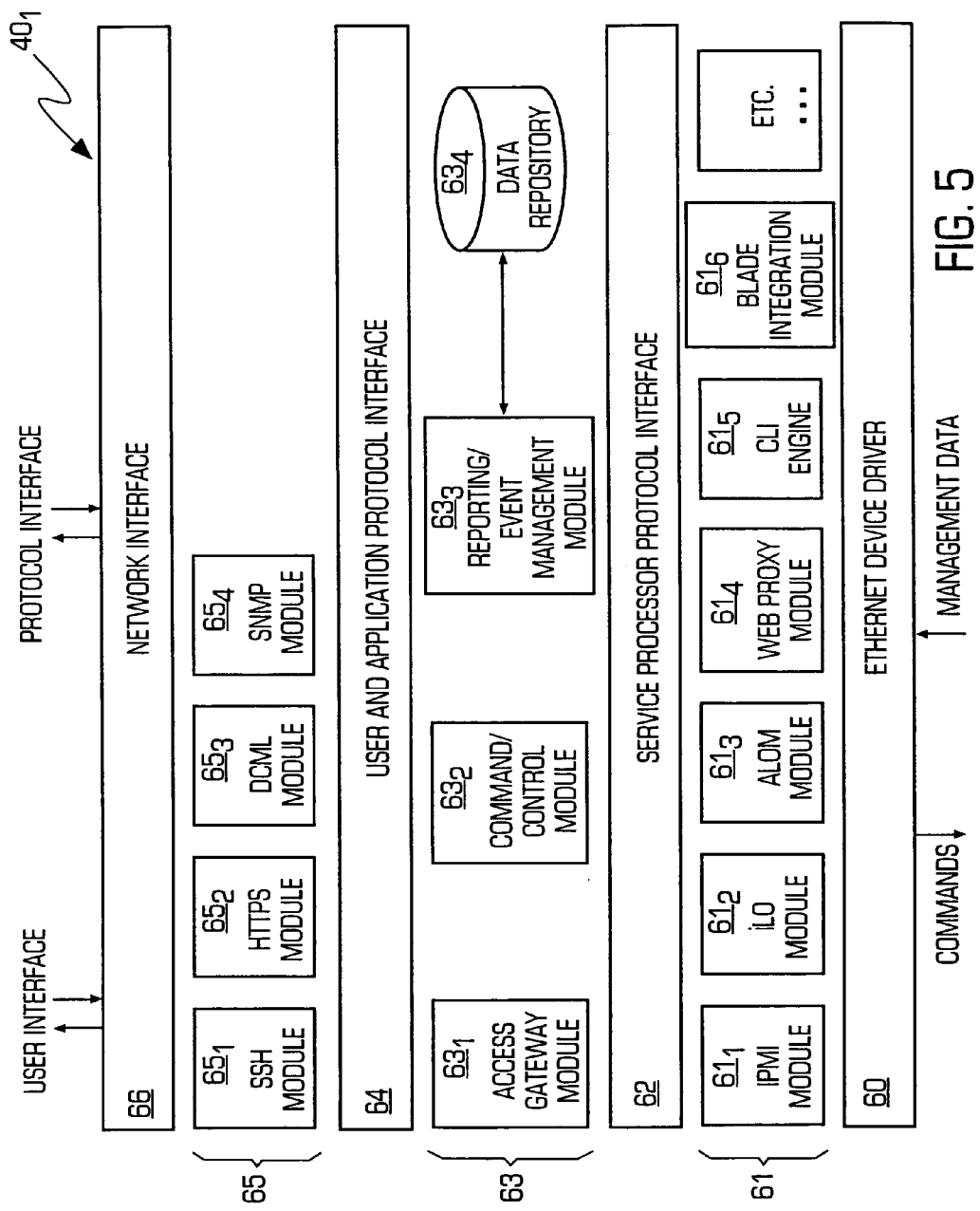
FIG. 5 is a diagram illustrating the software architecture of a preferred embodiment of the service processor gateway in accordance with the invention.

FIG. 5 is a diagram illustrating the software $40_1$ architecture of the service processor gateway 40 in accordance with the invention. In a preferred embodiment, each module of the software shown in FIG. 5 may comprise a one or more lines of computer code that are executed by the hardware of the service processor gateway in order to implement the function(s) of the particular module. The modules may also be implemented in other well known manners that are within the scope of the invention. As shown, the software may interact with the Ethernet connections to send commands and receive management data. The software may also interact with the communications network to send/receive user interface data and send/receive protocol interface data. To interface with the Ethernet connections, the software may include an Ethernet device driver 60. There may also be one or more connectivity modules 61 that are specific to the particular types of service processors connected to the service processor gateway. For example, there may be an intelligent platform management interface (IPMI) module $61_1$ terminates a session with service processors using the IPMI protocol. The IPMI protocol is documented at http://www.intel.com/design/servers/ipmi/ which is incorporated herein by reference. An integrated lights-out (ILO) module $61_2$ communicates to iLO service processors using iLO's command line interface. ILO is a protocol promulgated by Hewlett Packard and the iLO management interface is documented at http://h18013.www1.hp.com/products/servers/management/ which is incorporated herein by reference. An Advanced Lights-Out Management (ALOM) module $61_3$ communicates with ALOM service processors using ALOM's command line interface. ALOM is a protocol promulgated by Sun Microsystems and the ALOM protocol is documented at http://www.sun.com/servers/alom.html which is incorporated herein by reference. A web proxy module $61_4$ communicates with service processors and management modules using a web-based interface and a CLI engine $61_5$ communicates with generic management agents offering a command line interface. A Blade Integration module $61_6$ communicates with management modules in blade computers and telecommunication chassis. As service processors evolve and new proprietary and standard protocols are created, new connectivity modules can be added to the software modules 61 without departing from the scope of this invention so that service processor gateway can be used with any presently known service processors as well as yet to be developed service processors and other management technologies.

The connectivity modules 61 terminate the session with the service processors so that the management traffic is isolated from the data network. In other words, each connectivity module, for a particular protocol, terminates that protocol at the service processor gateway and converts the data into a common format. In addition, the service processor protocols are not propagated to the data network. Furthermore, the network addresses used in the Ethernet connections have only local scope and are not exposed to the data network, so that there is no requirement for a network address (IP address in a TCP/IP network) to be provisioned in the data network or be specifically secured by the managers of the data network for each service processor. A common service processor protocol interface module 62 may sit on top of the connectivity modules 61 and may provide a uniform interface between the connectivity modules 61 and one or more application modules 63 of the service processor gateway.

The application modules 63 offer different types of functionality so that the data collected from the service processors can be presented in a consolidated and meaningful way to local or remote users and management systems. Thus, the application modules may include an access gateway module $63_1$ that acts as a protocol gateway and provides direct access to the service processor user interface as described in more detail below. There may also be a command/control module $63_2$ that offers a uniform and platform-independent set of commands to the user and translates these uniform commands into commands that are specific to the type of service processors as described in more detail below. There may also be a reporting/event management module $63_3$ that collects data in a data repository $63_4$ and provides reports, notification of exceptions, and visualization of consolidated data to users as described in more detail below. As service processors and management techniques evolve, other applications modules can be added to the architecture without departing from the scope of this invention.

The software may further include a user and application protocol interface module 64 that sits on top of the applications modules 63 and provides a uniform interface between the application modules 63 and one or more service modules 65. The service modules 65 provide services to remote human users at management stations and/or management systems such as HP Open View, IBM Tivoli, BMC Patrol, and CA Unicenter using standard protocols suitable for transport over the data network. Through the service modules, remote users and management systems can get access to the services provided by the application modules as described in more detail below. For example, the service modules 65 may include an SSH service module $65_1$ that provides secure shell services to users accessing the service processor gateway using a well known SSH client. There may also be an HTTPS service module $65_2$ that provides web access to users accessing the service processor gateway using a web browser. There may also be a DCML service module $65_3$ that provides service processor gateway access to management systems using the well known data center markup language (DCML). There may also be an SNMP service module $65_4$ that provides service processor gateway access to management systems using the simple network management protocol (SNMP). As network management techniques evolve, new service modules can be added to the architecture without departing from the scope of this invention so that the invention can be expanded to handle any currently known or yet to be developed network management techniques. The software may further include a network interface module 66, located on top of the service modules 65, that connects the service processor gateway to the data network using standard networking protocols such as TCP/IP. Now, the operation of the gateway access module and the command/control module is described in more detail.

Figure 6:
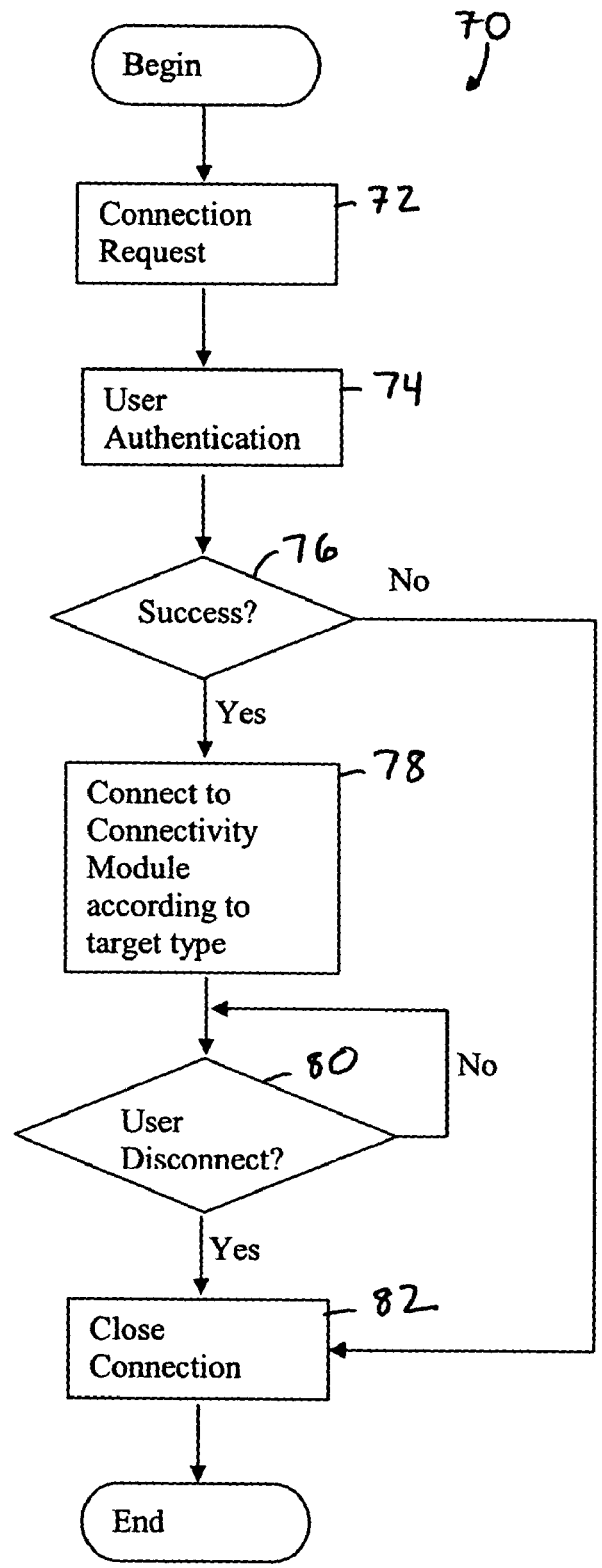
FIG. 6 is a flowchart illustrating a method for gateway access implemented in the access gateway module shown in FIG. 5 in accordance with the invention.

FIG. 6 is a flowchart illustrating a method 70 for gateway access implemented in the access gateway module shown in FIG. 5 in accordance with the invention. The access gateway module acts as a protocol gateway and provides direct access to the service processor user interface so that the access gateway module converts the protocols from the access and service processor units and lets the user transparently interact with the service processor interface that may be a command line interface, web-based, etc. Thus, in step 72, a user requests a connection to the module. In step 74, the user is authenticated such as by using a known enterprise directory system. If the user is not authenticated (as tested in step 76), the method goes to step 82 in which the connection is closed and the method is completed. If the user is authenticated, then in step 78, the module connects to the connectivity module according to the target type and performs the desired interaction with the particular service processor. Once the interaction is completed, the method determines if the user has disconnected in step 80 and then closes the connection in step 82 when the user has disconnected.

Figure 7:
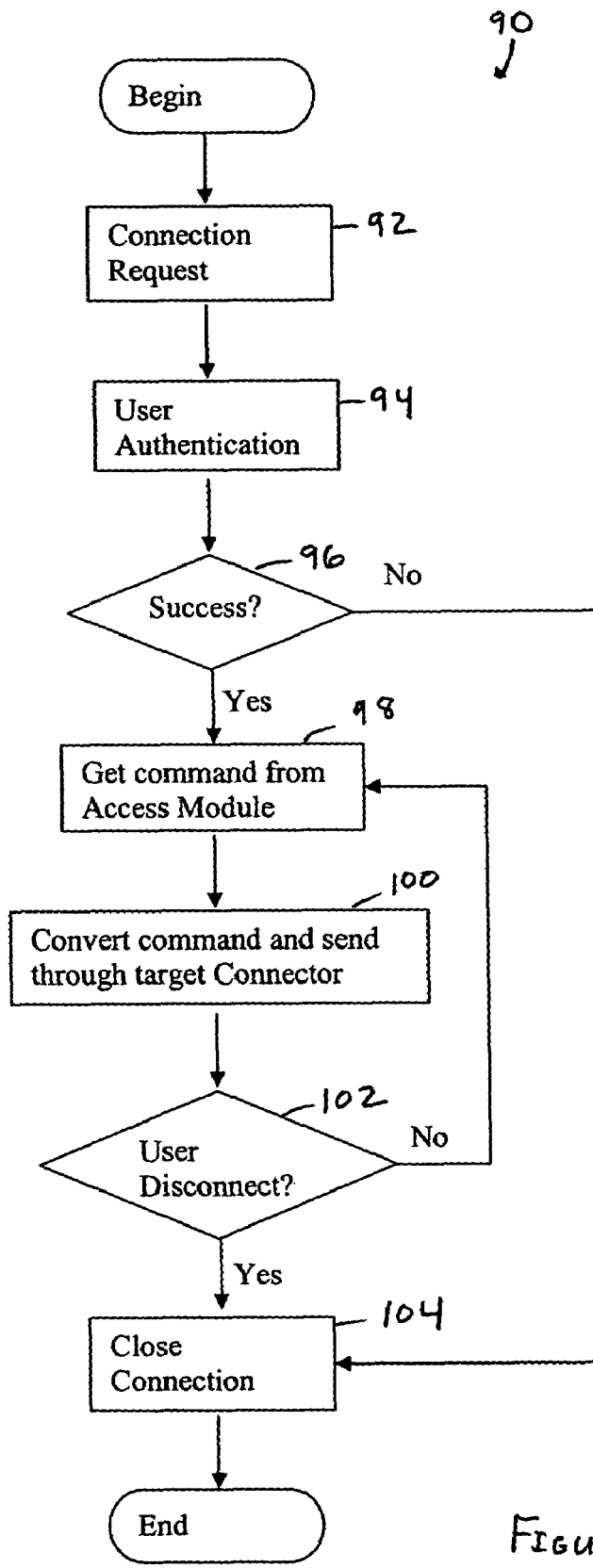
FIG. 7 is a flowchart illustrating more details of a method for command/control conversion implemented in the command/control module shown in FIG. 5 in accordance with the invention.

FIG. 7 is a flowchart illustrating more details of a method 90 for command/control conversion implemented in the command/control module shown in FIG. 5 in accordance with the invention. This module offers a uniform and platform-independent set of commands to the user and translates the uniform commands into commands with the particular format for each type of service processor. Thus, in step 92, a user requests a connection to the module. In step 94, the user is authenticated such as by using a known enterprise directory system. If the user is not authenticated (as tested in step 96), the method goes to step 104 in which the connection is closed and the method is completed. If the user is authenticated, then in step 98, the module obtains the command from the gateway access module and, in step 100, converts the command into the particular format for the particular service processor and sends the command through the appropriate connectivity module to the appropriate service processor so that the command is communicated to the service processor. Once the command is completed, the method determines if the user has disconnected in step 102 and then closes the connection in step 104 when the user has disconnected. To better understand how the invention can be used to manage a plurality of network nodes equipped with service processors, several illustrative examples are now provided.

Human Operator—Transparent Access

Referring to FIG. 3, if a human operator at the management workstation 29 needs to directly interact with the service processor 45, it can connect over the data network 44 or over an alternative out-of-band network 46 using either an SSH client or a web browser. Referring to FIG. 5, the user connection will be served by the corresponding service module 65 (SSH or HTTPS, depending on the protocol selected by the user) and will be routed to the access gateway module $63_1$, which will then open a connection to the service processor using the appropriated connectivity module 61, depending on the specific protocol utilized by the selected service processor. This is further detailed in FIG. 6, which describes the process executed by the access gateway module. The user will then be able to interact transparently with the service processor through the service processor gateway, which will be converting the protocols and emulating the service processor interface on the management workstation screen.

How the conversion of protocols is accomplished depends on the combination of access and connectivity protocols. Typically, there are three types of protocols interfaces: Command Line Interfaces (CLI), using a text base command syntax, Graphical User Interfaces (GUI), offering graphical interaction, typically through a web browser, or a Protocol-based interface, more suitable for management systems. As an example, if the human operation is using SSH protocol (a text session protocol) to access the service processor gateway and the target service processor utilizes a CLI, the access gateway module simple extracts the text from the service processor communication and encapsulates it in SSH protocol before forwarding it to the human operator, a well known conversion process. If the human operator was using the HTTPS protocol with a web browser, the access gateway module would present the text session on a window displayed on the web browser.

Human Operator or Management System—Command and Control

Referring to FIG. 3, if a human operator at the management workstation 29 or the management system 28 need to perform management actions involving one or more service processor $45_{1-n}$, it can connect over the data network 44 or over an alternative out-of-band network 46. A human operator would typically use an SSH client or a web browser. The Management System would typically use a protocol such as SNMP or DCML. As an example, the desired management action by the user is power cycling a group of network nodes. Other examples of possible actions would be to retrieve temperature readings, retrieve system status information or power of one or a group of network nodes.

Referring to FIG. 5, the connection will be served by the corresponding service module (SSH or HTTPS for human operators or DCML or SNMP for management systems) and will be routed to the command/control module $63_2$, which will then open a connection to the selected service processors using the appropriated connectivity module 61. The command/control module provides a uniform interface to the human operator or management system (using a command line, web or protocol-based interface) and is able to take command or control requests, passing them to the appropriated connectivity modules so that the commands are properly converted into the protocols for each specific type of service processor. This is further detailed in FIG. 7, which describes the process executed by the command/control module.

How the conversion of commands is accomplished depends on the combination of access and connectivity protocols. As an example, if a human operator accesses the service processor gateway with a web browser, a graphical screen displaying all the network nodes could be displayed. The user would be able to select a group of network nodes using well known graphical user interface methods and then click on a "power cycle" button, requesting that all the selected network nodes be power cycled. The command/control module would then issue a "power cycle" command using the adequate protocol to communicate with each service processor.

Human Operator or Management System—Reporting and Event Management

Referring to FIG. 3, if a human operator at the management workstation 29 or the management system 28 needs to obtain consolidated management event information or request active notification of management events involving one or more service processor $45_{1-n}$, it can connect over the data network 44 or over an alternative out-of-band network 46. A human operator would typically use an SSH client or a web browser. The management system would typically use a protocol such as SNMP or DCML. One example of reporting/event management action would be to obtain a list of all operating system failures affecting any network node over the past 24 hours. Other examples of reporting/event management actions would be requesting future notification in case the temperature on any managed node goes above a certain threshold or request a list of all systems currently out of normal operation.

Referring to FIG. 5, the connection will be served by the corresponding service module (SSH or HTTPS for human operators or DCML or SNMP for management systems) and will be routed to the reporting/event management module $63_3$, which is constantly monitoring the network devices through the appropriate connectivity modules and accumulating management data in the data repository $63_4$. The reporting/event management module provides the ability of collecting management data locally and providing consolidated reports and active event management to local or remote human operators or management systems. Automated management of large sets of network nodes is a key functionality in large data centers.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An out-of-band management system for computer networks, the system comprising:
   one or more network nodes equipped with a service processor and a management port accessible externally through a dedicated management interface other than a data transmission interfaces wherein the dedicated management interface further comprises an Ethernet-type interface;
   a service processor gateway management appliance, directly connected to an Ethernet Switching System via a first Ethernet port and directly connected to the management ports of the network nodes via corresponding point-to-point Ethernet connections different from the first Ethernet port, that isolates the management ports of the network nodes from direct access by a data network;
   the service processor gateway management appliance being connected to a separate network management system via a direct out-of-band connection; and
   the service processor gateway further comprising a processor and a software application, executed by the processor, that provides one or more of a command line interface, a web interface and a protocol-based interface for access by one of a human operator and a network management system.

2. The system of claim 1, wherein the software application of the service processor gateway further comprises a connectivity module with a plurality of computer instructions executed by the processor that converts one or more low-level protocols utilized by one or more management interfaces of the service processors into a common protocol to generate common management data suited for transmission over a TCP/IP network to the network management system.

3. The system of claim 1, wherein the software application of the service processor gateway further comprises a module with a plurality of computer instructions executed by the appliance tat encrypts the common management data in order to prevent the common management data from being intercepted when in transit to the network management system.

4. The system of claim 1, wherein the software application of the service processor gateway further comprises a module with a plurality of computer instructions executed by the appliance that communicates with an enterprise directory system to authenticate a user before giving them access to the management interfaces.

5. The system of claim 1, wherein the software application of the service processor gateway further comprises a module with a plurality of computer instructions executed by the appliance that converts command and control requests from the command-line, web or protocol based interfaces to one or more management protocols specific to a particular service processor.

6. A service processor gateway appliance, comprising:
   a processor;
   a memory connected to the processor;
   a plurality of Ethernet interfaces, wherein each interface is configured to establish a point to point connection directly with a management port of a network node having a service processor, that isolates the management port of the network node from direct access by a data network;
   an interface for a connection to an Ethernet Switching System;
   an interface for a direct out-of-band connection to a separate network management system;
   a software application, stored in the memory and executed by the processor, comprising one or more portions with each portion having a plurality of lines of computer instructions; and
   the one or more portions further comprising a connectivity portion that converts a management interface of each service processor into a common protocol to generate common management data, a service portion that interfaces with one or more management protocols from an external source and exchanges commands and data with the external source, and an application portion that manipulates the common management data based on the commands from the external source and generates management output data to the one or more management protocols.

7. The appliance of claim 6, wherein the connectivity portion further comprises one or more protocol portion wherein each protocol portion converts management data from a particular service processor with a particular protocol into a common management data protocol.

8. The application of claim 7, wherein the protocol portions further comprise one or more of an intelligent platform management interface portion, an integrated lights out portion, an advanced lights out portion, a web proxy portion, a command line interface portion and a blade portion.

9. The appliance of claim 6, wherein the service portion further comprises one or more service protocol portions wherein each service protocol portion converts commands and data from an external source having a particular protocol into a common management protocol.

10. The application of claim 9, wherein the service protocol portions further comprises one or more of a secure shell portion, a secure socket layer portion, an extended markup language protocol portion, a secure hypertext transfer protocol portion, a data center markup language portion and a simple network management protocol portion.

11. The application of claim 6, wherein the application portion further comprises an access gateway portion that provides direct access to a user interface of the service processor connected to the service processor gateway.

12. The application of claim 6, wherein the application portion further comprises a command/control portion that provides platform-independent set of commands to the user and translates these uniform commands into commands that are specific to the type of service processor.

13. The appliance of claim 6, wherein the application portion further comprises a reporting portion and the appliance further comprises a data repository that stores data associated with the reporting portion, wherein the reporting portion collects data in the data repository and provides reports, notification of exceptions, and visualization of the management data.

* * * * *